(12) United States Patent
Yoshida et al.

(10) Patent No.: US 6,647,192 B1
(45) Date of Patent: Nov. 11, 2003

(54) OPTICAL FIBER

(75) Inventors: Minoru Yoshida, Hyogo (JP); Kazuo Imamura, Hyogo (JP); Tadahiko Nakai, Hyogo (JP); Yasuhide Sudo, Hyogo (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 09/959,776

(22) PCT Filed: May 1, 2000

(86) PCT No.: PCT/JP00/02898

§ 371 (c)(1),
(2), (4) Date: Nov. 7, 2001

(87) PCT Pub. No.: WO00/69038

PCT Pub. Date: Nov. 16, 2000

(30) Foreign Application Priority Data

May 7, 1999 (JP) .......................................... 11-126869

(51) Int. Cl.$^7$ ................................................. G02B 6/34
(52) U.S. Cl. ........................................ 385/127; 385/142
(58) Field of Search .................................. 385/123, 127, 385/141, 142, 143, 144, 145

(56) References Cited

U.S. PATENT DOCUMENTS

| 5,237,576 A | * | 8/1993 | DiGiovanni et al. ........... 372/6 |
| 5,533,163 A |   | 7/1996 | Muendel ....................... 385/126 |
| 5,864,645 A |   | 1/1999 | Zellmer et al. ............. 385/126 |
| 6,314,221 B1 | * | 11/2001 | Riant et al. .................... 385/37 |

FOREIGN PATENT DOCUMENTS

JP    A11-52162    2/1999

* cited by examiner

Primary Examiner—Hung N. Ngo
(74) Attorney, Agent, or Firm—Birch, Stewart, Kolasch & Birch, LLP

(57) ABSTRACT

A long period grating (8) by which an excitation light propagated through the 2nd core (4) of a double-core type optical fiber composed of the 2nd core (4) formed on the outer circumference of the 1st core (2) is guided into the 1st core (2) is formed on the 1st core (2) to improve an excitation efficiency.

4 Claims, 2 Drawing Sheets

OPTICAL FIBER

This application is the national phase under 35 U.S.C. § 371 of PCT International Application No. PCT/JP00/02898 which has an International filing date of May 1, 2000, which designated the United States of America.

FIELD OF THE INVENTION

The present invention relates to an optical fiber used for light amplification utilizing stimulated emission phenomenon and as a medium for laser oscillation.

BACKGROUND ART

Among optical fibers that are generally used as amplifying elements for directly amplifying signal light by utilizing a stimulated emission phenomenon, those of double-core type as shown in FIGS. 2 to 4 are conventionally known.

The double-core type optical fiber 1 is constituted such that a 2nd core 4 and a clad 6 are sequentially formed on an outer circumference of a 1st core 2.

The 1st core 2 is of quartz series with an outer diameter thereof being set to be either of single mode or multi mode, and a rare-earth element (such as Nd or Er) is doped within the 1st core 2.

The 2nd core 4 is also of quartz series, similarly to the 1st core 2, and has a cross-sectional area that is sufficiently larger than a cross-sectional area of the 1st core 2 such that an excitation light from an excitation light source such as a laser diode having a large emission area can be guided into the optical fiber at high efficiency, and is thus of multi mode with respect to the excitation light.

The clad 6 is made of a high molecular resin such as urethane acrylate series or polymethyl methacrylate for purpose of protection as well as confinement of light.

Concrete sizes of the optical fiber 1 may be set such that, for example, an outer diameter of the 1st core 2 is approximately 10 $\mu$m, an outer diameter of the 2nd core 4 is approximately 400 $\mu$m, and an outer diameter of the clad 6 is approximately 450 $\mu$m. As for refractive index distribution, for example, it is set such that a refractive index $n_2$ of the 1st core 2 is approximately 1.463 to 1.467, a refractive index $n_4$ of the 2nd core 4 is approximately 1.45 to 1.46 and a refractive index $n_6$ of the clad 6 is approximately 1.40 as shown in FIG. 3, and is set in a step-wise shape such that the refractive index becomes gradually smaller in getting further outward.

The double-core type optical fiber 1 amplifies the signal light in the following manner. That is, for example, in the case of an optical fiber in which Nd is doped within the 1st core 2, the signal light in a zone of 1.06 $\mu$m is made incidence into the 1st core 2 while the excitation light in a zone of 0.80 $\mu$m is made incidence not only into the 1st core 2 but also into the 2nd core 4. Pumping of the 1st core 2 is performed by the excitation light propagating through the 1st core 2 and the 2nd core 4 so as to amplify the signal light. Especially, the excitation light propagating through the 2nd core 4 acts to excite the 1st core 2 when crossing the 1st core 2, as shown in FIG. 4.

In this manner, since the double-core type optical fiber 1 can guide the high output excitation light within the 2nd core 4 occupying a comparatively large region around the 1st core 2 even when it is difficult to directly make incidence the high output excitation light into the 1st core 2, so-called lateral excitation effect can be obtained, so that there is an advantage to be capable of efficiently performing the light amplification.

However, in the double-core type optical fiber 1, while the excitation light propagating through the 2nd core 4 acts to excite by being absorbed by the 1st core 2 when crossing the 1st core 2 as shown in FIG. 4, such only lateral excitation is not sufficient to improve excitation efficiency since a length at which the excitation light propagating through the 2nd core 4 intersects with the 1st core 2 is considerably short.

Moreover, among the excitation light made incidence within the 2nd core 4, a light having a component that do not intersect the 1st core 2 merely turn within the 2nd core 4 along a circumferential direction but not contribute to excitation of the 1st core 2.

Due to above-described facts, there are limits in securing sufficient excitation efficiency by using the structure of conventional the double-core type optical fiber.

An object of the present invention is to further improve excitation efficiency than the prior art such that the excitation light propagating through the 2nd core is guided into the 1st core at further higher frequency than the prior art in the double-core type optical fiber.

DISCLOSURE OF THE INVENTION

As disclosed in Japanese Unexamined Patent Publication No. Hei 6-235808 (1994), for example, it is known for a method of applying periodic refractive modulation to a core of an optical fiber so as to form a grating by periodically irradiating an ultraviolet light onto the optical fiber from an external laser light source via a diffraction grating.

The grating formed in such optical fiber, especially a long period grating, is conventionally used as a filter for eliminating the light from the core by coupling the light adjacent to a wavelength corresponding to the period with a clad by means of mode coupling.

However, in the double-core type optical fiber, since a 2nd core is formed on an outer circumference of a 1st core, a formation of a long period grating in the 1st core will cause introduction of light propagating through the 2nd core into the 1st core by mode coupling, contrary to the function of the above-described filter.

The present invention has been made in view of such an aspect, and a long period grating has been formed in the 1st core in so-called double-core type optical fiber. With this structure, the excitation light propagating through the 2nd core will be guided into the 1st core by mode coupling and will be propagated along an axial direction of the 1st core, so that so-called axial directional excitation is performed and higher excitation efficiency when compared to lateral excitation only can be obtained.

Further, in the above-described improved optical fiber of the present invention, the long period grating is respectively formed for respective modes propagating to the 2nd core. With this structure, since the excitation light is mode coupled for each of the modes to guide in the 1st core by using the long period grating corresponding to each of the modes, the excitation efficiency is further improved.

Further, in the above-described improved optical fiber of the present invention, the plurality of long period gratings are provided and a distance between adjacent long period gratings is set to be a distance that is sufficient to enable the rare-earth elements absorb the excitation light propagating through the 1st core. With this structure, the excitation efficiency is further improved.

In the above-described improved optical fiber of the present invention, a clad is further formed on an outer circumference of the 2nd core and the clad is composed of a substance transmitting the ultraviolet light. With this structure, by periodically irradiating the ultraviolet light to the 1st core, it is possible to make the ultraviolet light reach to the 1st core 2 without exfoliating the clad when forming the long period grating.

BRIEF EXPLANATIONS OF THE DRAWINGS

BEST MODE FOR CARRYING OUT THE INVENTION

The best mode for carrying out the present invention will now be explained in details with reference to FIG. 1.

Figure 1:
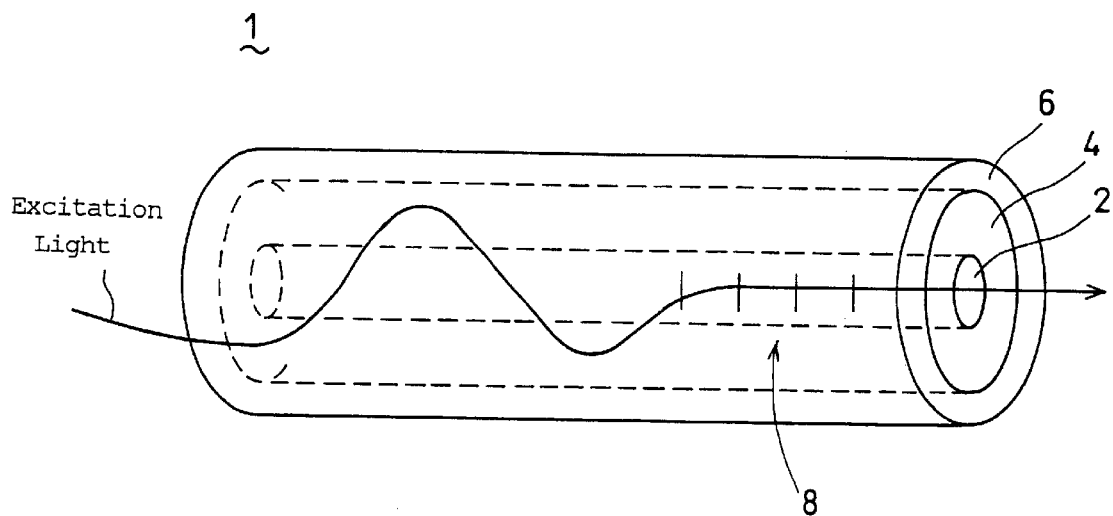
FIG. 1 is a perspective view showing a double-core type optical fiber in accordance with an embodiment of the present invention.
Figure 2:
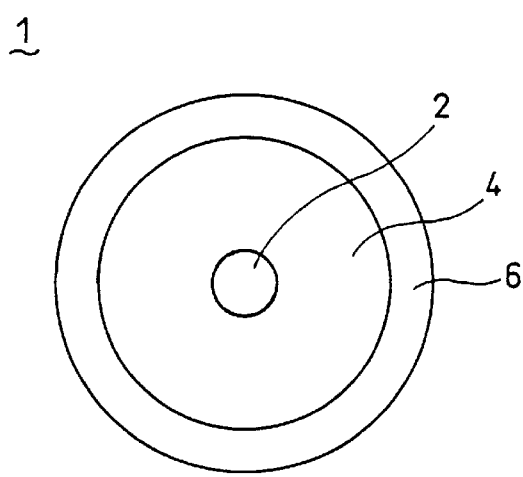
FIG. 2 is a sectional view showing a double-core type optical fiber in accordance with the prior art.
Figure 3:
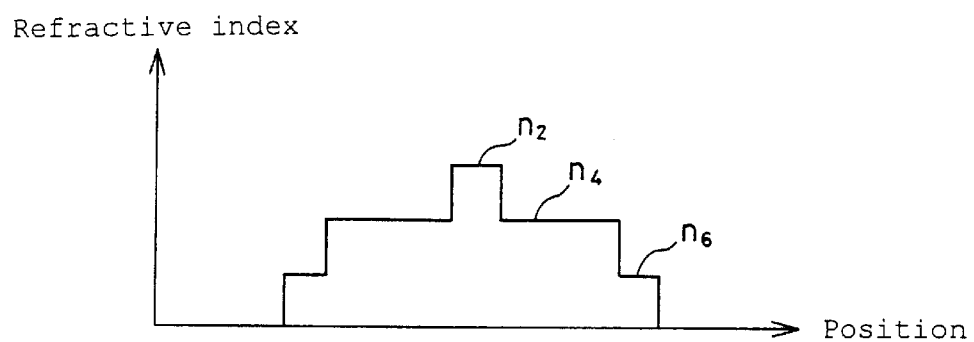
FIG. 3 is a diagram showing a refractive index distribution of the optical fiber of FIG. 2.
Figure 4:
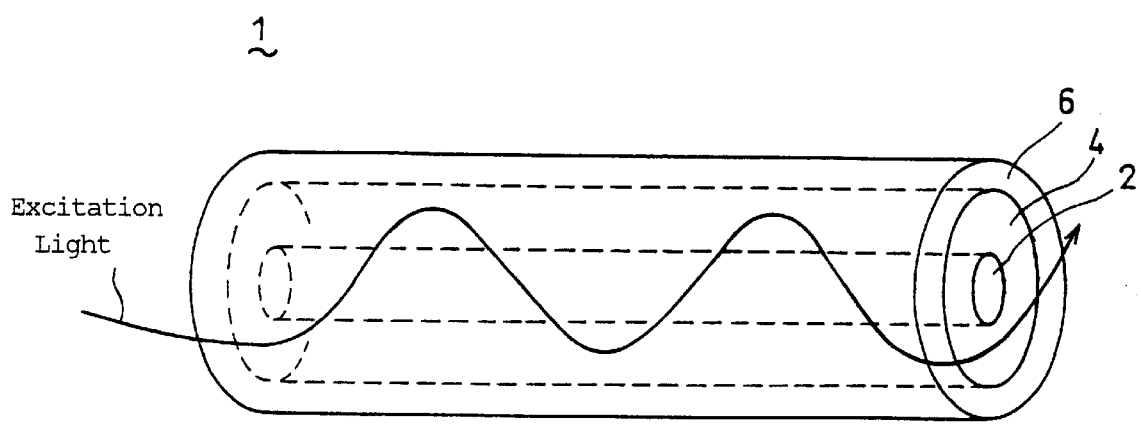
FIG. 4 is a perspective view showing the optical fiber of FIG. 2.

FIG. 1 is a perspective view of the double-core type optical fiber in accordance with one embodiment of the present invention, and portions corresponding to those of the prior art as shown in FIGS. 2 to 4 indicate with identical reference numerals.

In FIG. 1, 1 denotes the entire optical fiber, 2 denotes a 1st core, 4 denotes a 2nd core and 6 denotes a clad, and since these structures are identical to those of the prior art as shown in FIGS. 2 to 4, detailed explanations thereof will be omitted herein.

The present embodiment is characterized in that a long period grating 8 is formed within the 1st core 2 for guiding the excitation light propagating through the 2nd core 4 into the 1st core 2.

In the optical fiber 1 of this structure, when the excitation light propagating through the 2nd core 4 reaches to the long period grating 8, the light will be guided into the 1st core 2 by means of mode coupling so as to be propagated along an axial direction of the 1st core 2 over a long distance and thereby performing so-called axial directional excitation.

While the excitation light propagating through the 2nd core 4 is conventionally so-called lateral excitation in which the excitation is achieved by intersecting the 1st core 2, the excitation light is actively guided into the 1st core 2 through the long period grating 8 in the optical fiber so that a frequency of contributing to the excitation of the signal light in the 1st core 2 becomes higher and the excitation efficiency is increased.

For mode coupling of the excitation light propagating through the 2nd core 4 with the 1st core 2 by using the long period grating 8, it is necessary to satisfy the following relationships.

In the case that the excitation light propagating thorough the 2nd core 4 by using the long period grating 8 is propagated to the 1st core 2 doped with a rare-earth element, conditions vary according to modes of the 2nd core 4 to be coupled to. When limiting to a particular mode from various conditions, the following conditions may be listed for the long period grating 8.

In the case that a specific refractive index difference $\Delta_1$ of the 1st core 2 is 0.3%, a cutoff wavelength is 0.8%, a specific refractive index difference $\Delta_2$ of the 2nd core 4 is 0.1 to 1%, and an outer diameter of the 2nd core 4 is 125 $\mu$, it is preferable that the period for the long period grating 8 is 100 to 500 $\mu$m, and a refractive index modulation level $\Delta n_{mod}$ of the long period grating 8 is $1\times10^4$ to $1\times10^2$.

From among the above-described conditions, a plurality of periods exist for the long period grating 8 according to modes to be coupled to, and in the case that a plurality of long period gratings 8 are written to one optical fiber 1 in correspondence with the respective modes, it is possible to further contribute to high efficiency.

In the case writing a plurality of long period gratings 8, the distance between the respective long period gratings 8 shall be a distance that is required for the rare-earth element such as Nd or Er to sufficiently absorb the excitation light propagating through the 1st core 2. If the distance is not provided sufficiently, the excitation light propagating through the 1st core 2 will be guided out for the 2nd core 4 by the following long period trading 8.

It goes without saying that a length required for sufficiently absorbing the excitation light is not a length in which the excitation light is completely absorbed, but a length in which the excitation light is absorbed to an extent where the efficiency is increased by the multi mode excitation light propagating the new 2nd core 4 guided to the 1st core 2 by using the following long period grating 8.

By the way, such a long period grating 8 is formed in the 1st core 2 by periodically irradiating ultraviolet light to the optical fiber 1 from an external laser light source via a diffraction grating (not shown), a phase mask, a mirror or the like. At this time, it is necessary to make the ultraviolet reach to the 1st core 2 in a reliable manner. While the 2nd core 4 does not need to be particularly considered since it transmits the ultraviolet light, in the case that the clad 6 does not transmit the ultraviolet light, the ultraviolet light will not reach to the 1st core 2 until the clad 6 is exfoliated. Accordingly, in the present embodiment, by forming the clad 6 of a material transmitting the ultraviolet light, the long period grating 8 is formed in the 1st core 2 without the necessity of requiring troublesome clad exfoliation processes. An example of a material transmitting the ultraviolet light that may be used for forming the clad 8 is high-molecular resin having ultraviolet light transmitting properties.

Industrial Applicability

According to the present invention, in accordance with a double-core type optical fiber, since an excitation light propagating through a 2nd core is guided along an axial direction of a 1st core by means of mode coupling of a long period grating, it is possible to achieve an axial directional excitation and thereby improving excitation efficiency.

In this case, it will be possible to perform sufficient amplification even in a short-dimensioned fiber while it is hardly affected by background loss or the like, so that it is possible to perform actions at high efficiency.

What is claimed is:

1. An optical fiber having a 1st core doped with a rare-earth element and a 2nd core formed on an outer circumference of said 1st core, in which a refractive index thereof is set to be smaller than that of said 1st core, wherein a long period grating for guiding an excitation light propagating through said 2nd core into said 1st core by means of mode coupling is formed in said 1st core.

2. The optical fiber according to claim 1, wherein said long period grating is respectively formed for each mode propagating through said 2nd core.

3. The optical fiber according to claim 1, wherein a plurality of said long period gratings are formed and a distance between adjacent long period gratings is set to be a sufficient distance in which said rare-earth elements absorb the excitation light propagating through said 1st core.

4. The optical fiber according to claim 1, wherein a clad is further formed on an outer circumference of said 2nd core, and the clad is composed of a substance transmitting an ultraviolet light.

* * * * *